March 12, 1968  B. L. SCHULMAN  3,373,102
PRETREATMENT OF CATALYTIC CRACKING FEED STOCKS
Filed Dec. 17, 1965
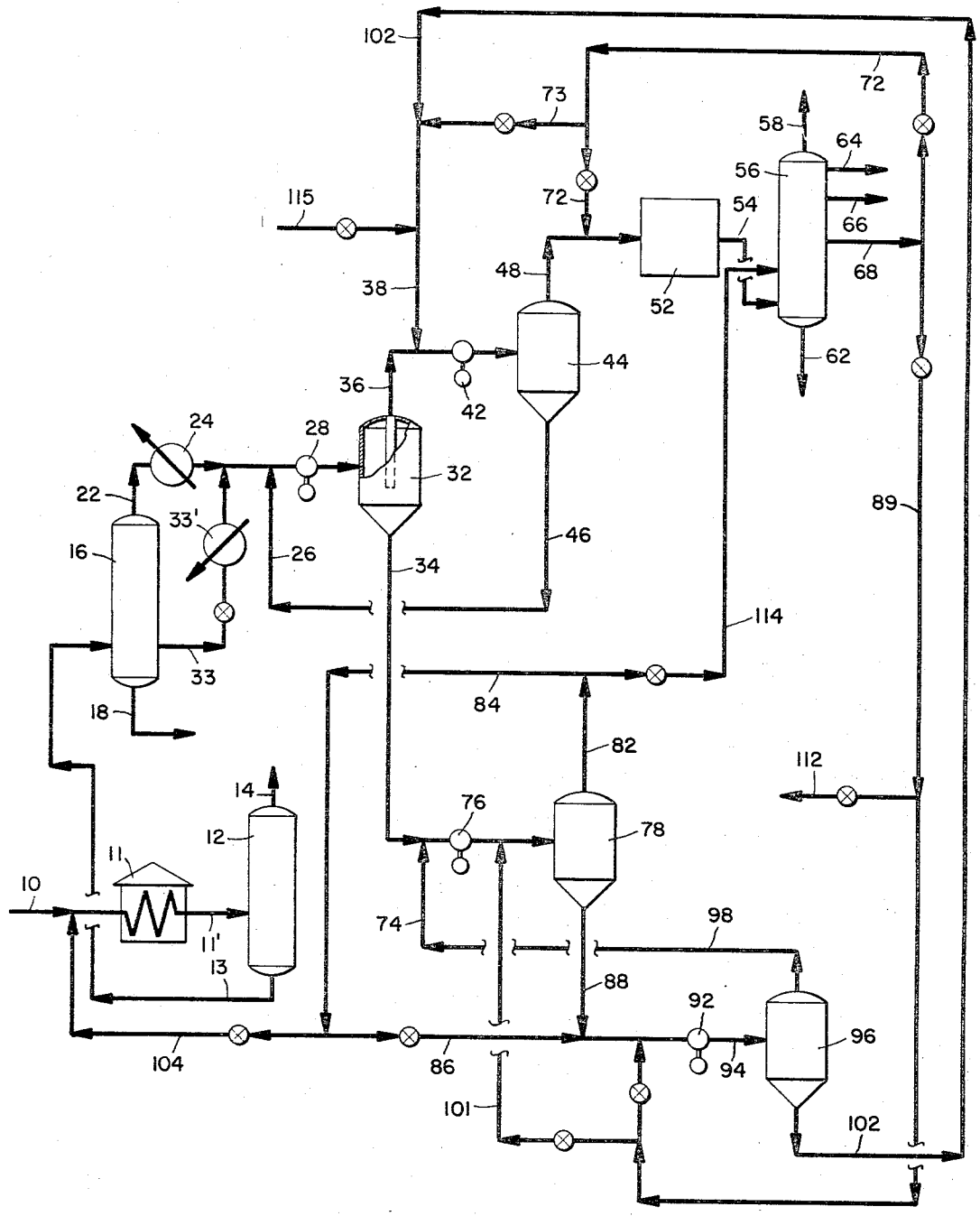
*BERNARD L. SCHULMAN* INVENTOR
BY
PATENT ATTORNEY

3,373,102
PRETREATMENT OF CATALYTIC CRACKING FEED STOCKS

Bernard L. Schulman, Livingston, N.Y., assignor to Esso Research and Engineering Company, a corporation of Delaware
Filed Dec. 17, 1965, Ser. No. 514,603
6 Claims. (Cl. 208—91)

This invention relates to a process for the treatment of petroleum oil feed stocks to remove or reduce the amount of catalyst contaminating material in the oil feed.

Contamination of catalysts used in the catalytic cracking of petroleum oil feeds has long been a problem in the petroleum industry. Commercial gas oils, including residual petroleum oils, containing sufficiently high amounts of metals, Conradson Carbon and polynuclear aromatics to render them unsuitable for catalytic cracking, may be efficiently upgraded by contacting the oil feed with finely divided cracking catalyst particles which will absorb or remove these harmful components with excellent selectivity. Accumulation of nickel, vanadium and iron compounds on the silica-alumina cracking catalyst particles used in catalytic cracking units affects cracking yields by increasing coke production and light gas production, especially hydrogen, at the expense of gasoline.

The metals are postulated to exist as large high boiling ring complex aromatic compounds called porphyrins and characterized as "volatile" or "non-volatile." The volatile porphyrins have an average vapor pressure equivalent to a hydrocarbon boiling at about 1150° F., while the non-volatile porphyrins are possibly polymeric in character and have a boiling point more than about 1300° F. These complex contaminating compounds are adsorbed on the catalyst during the cracking operation and are thought to split open, leaving behind the metal as a contaminating deposit. As nickel is the worst offender as a contaminant, the metal or concentration content of an oil is here expressed in terms of "equivalent nickel" by the relation:

Equivalent $Ni = Ni + 1/5$ (Vanadium) $+ 1/10$ (Iron)

(Concentrations of metal are given in parts per million by weight, w.p.p.m.)

Various methods have been tried heretofore for removal of metals from the oil feeds but they have not been entirely successful or have been too expensive or too cumbersome.

According to the present invention a high boiling oil feed which contains high boiling polynuclear aromatic hydrocarbons and metals and includes those aromatic hydrocarbons having metal atoms in large ring complexes is removed from a pipe still and/or vacuum still and is mixed with finely divided fresh or regenerated cracking catalyst particles at an elevated temperature but below a temperature for cracking. The catalyst particles are then separated as a slurry from the oil in a liquid cyclone separator or hydroclone or "Dorrclone." The liquid hydroclone is exceedingly efficient and gives 90–95% yield of purified catalytic cracking oil feed.

Preferably more than one stage of treatment of the oil feed with catalyst particles is used. The treated oil is taken overhead and the spent catalyst is withdrawn from the bottom of the hydroclone. The treated oil is then catalytically cracked in accordance with conventional practice and the catalytically cracked products are fractionated into a gas fraction, a gasoline fraction, a light aromatic heating oil, an aromatic heavy cycle gas oil or recycle oil fraction and a bottoms fraction.

The aromatic heavy cycle oil is a good solvent for polynuclear or heavy aromatic hydrocarbons. These heavy aromatic compounds with which the contaminating metals are associated are preferentially and easily adsorbed from gas oils by fresh or regenerated catalyst particles. Light aromatic heating oil or even naphtha may be used as a solvent but the heavy cycle oil is preferred because of its better solvent properties.

The spent cracking catalyst particles are mixed with a portion of the heavy cycle gas oil fraction separated from the catalytically cracked products and the mixture passed to a hydroclone to separate regenerated catalyst particles from the cycle oil fraction which acts to wash off and dissolve the adsorbed contaminants or impurities from the catalyst particles. Preferably more than one stage of washing or regenerating the catalyst is used. In the hydroclone, the washed or regenerated catalyst particles are separated from the heavy cycle gas oil wash liquid and recycled to the oil treating step to remove heavy or high boiling aromatic hydrocarbon compounds and the like from the oil feed.

The cycle oil wash liquid separated in the hydroclone contains impurities dissolved in the oil wash or removed from the catalyst particles and a portion of this wash liquid may be recycled as part of the wash liquid used to regenerate the catalyst particles. Part of the contaminated cycle oil wash liquid is passed to the pipe still or vacuum still where the high boiling aromatic hydrocarbon compounds are separated from the heavy cycle gas oil and removed as bottoms and discarded. Or part of the contaminated wash liquid may be passed to the product fractionator of the catalytic cracking unit where high boiling aromatic hydrocarbon compounds are removed as bottoms and discarded.

Heavy cycle gas oil separated from the catalytic cracking products fractionator is the aromatic wash liquid or solvent used to regenerate the spent adsorbent catalyst particles. This is one of the advantages of the present invention as make-up wash liquid or solvent is readily available from the catalytic cracking products fractionator as the heavy aromatic cycle gas oil stream. The use of the cycle stock makes the solvent loss zero, since any of the cycle oil solvent which remains in the catalyst or oil feed will go eventually to the catalytic cracking unit which is its ultimate goal anyway. The cycle oil passes to the catalytic cracking step with treated feed. Any fine catalyst particles containing cycle oil solvent which are carried over into the catalytic cracking unit go through the cracking step to crack the occluded solvent and then the spent fine catalyst particles are discarded from the final stages of regeneration and reactor fractionator bottoms.

In the drawing the figure diagrammatically represents one form of apparatus adapted to carry out the process of the present invention.

Referring now to the drawing, the reference character 10 designates a line for feeding oil to the furnace 11. The oil feed may be a crude petroleum oil, topped crude, residual oil from an atmospheric or vacuum still, a heavy gas oil, extraneous stocks, etc., which contains metal contaminants, high Conradson carbon and polynuclear aromatic hydrocarbons including those having four or more rings. The oil feed to be treated is heated to a temperature between about 600° F. and 800° F., and the heated oil is passed through furnace 11 and line 11' to atmospheric still 12 to separate vapors from a bottoms fraction withdrawn through line 13. The vapors pass overhead through line 14 and may be subsequently separated into gas, naphtha and heating oil fractions. The bottoms from line 13 are passed to the lower portion of a vacuum pipe still 16 to separate a distillate oil from higher boiling hydrocarbons or vacuum pipe still bottoms. The still 16 is under a pressure of between 40 and 150 mm. of mercury. It is not essential to have both an atmospheric still and a vacuum still as either one may be omitted if desired.

The bottoms fraction from vacuum still 16 and boiling above about 1100–1200° F. is withdrawn through line 18 and may be discarded or passed to a visbreaking step to produce additional catalytic cracking feed stock. The distillate hydrocarbons boiling below about 1200° F. pass overhead through line 22, are cooled to between 400° F. and 500° F. in cooler or condenser 24 and the liquid hydrocarbons are mixed with an oil slurry of finely divided catalytic cracking catalyst from line 26 which is partially spent coming from a second separation stage later to be described. The distillate hydrocarbon feed has a boiling range of about 600° F. to 1200° F. The oil-catalyst mixture is passed through pump 28 where additional mixing takes place and the resulting mixture is introduced into hydroclone 32 to separate catalyst particles from purified oil. The catalyst-oil mixture is maintained at a temperature between about 400° F. and 500° F. for between 0.25 and 1 minute. The distillate oil feed in line 22 has about 1–3 w.p.p.m. equivalent nickel, being composed of 0.2 to 2.0 w.p.p.m. of vanadium, about 0.1 to 2.0 w.p.p.m. of nickel and about 1 to 10 w.p.p.m. of iron.

If desired, a side stream may be withdrawn from the vacuum still 16 through valved line 33 provided with a cooler 33′ and the cooled side stream passed into line 22 ahead of pump 28. This side stream may be 50% or less of the total distillate stream in line 22 and would have a higher metals level than the overhead distillate in line 22 and could also be used as a wash oil stream. Other oil feeds may be used as catalytic cracking oil feeds. For example, all or a portion of the heating oil fraction, boiling above 450° F., from line 14 may be passed directly to hydroclone 32. Other extraneous oil stocks may be used as oil feeds to be treated according to the present invention.

The finely divided cracking catalyst used in this invention for treating oil feeds may be any conventional cracking catalyst, such as silica-alumina catalyst, containing 10–35% alumina or it may be an acid treated bentonite clay or synthetic silica-alumina magnesia catalyst or silica-magnesia catalyst, etc. The catalyst is finely divided and has a large surface area as the adsorption of the impurities or contaminants in the oil is a surface effect and the more surface that is presented by the catalyst particles, the better adsorption and removal of the aromatic metal-containing compound or compounds which is obtained. The heavy or high boiling aromatic hydrocarbon compounds are preferentially adsorbed by the catalyst particles. Cracking catalyst which is off-specification because it is too fine can be used. The catalyst particles in hydroclone 32 absorb the impurities from the oil feed being treated.

The catalyst is preferably fresh catalyst having a surface area of 450 to 600 m.²/g., but may be regenerated catalyst having a surface area of 75 to 150 m.²/g. The catalyst particles are of a size below 150 microns, preferably between about 5 and 100 microns. The amount of fresh catalyst particles used is between 0.05 and 0.50 part by weight to 1 part by weight of oil to be treated.

Surface area of the catalyst particles controls the amount of catalyst used. In the examples hereinafter described, the surface area of the catalyst is between 400 and 500 m.²/g. The amount of catalyst used is inversely proportional to the surface area of the catalyst.

The catalyst is separated from the oil in the hydroclone 32 which is similar in its action to a cyclone separator. The hydroclone 32 is exceedingly efficient and separates 95 to 99.9% of the catalyst particles from the oil. The separated spent catalyst particles with some occluded oil are withdrawn as a slurry from the hydroclone 32 through bottom line 34 and are regenerated by a washing or solvent treatment, as will be hereinafter described in greater detail. The oil slurry in line 34 is about 50 weight percent catalyst and 50 weight percent oil.

The separated oil is withdrawn overhead from the hydroclone 32 through line 36 and is mixed with a clean washed or solvent regenerated finely divided cracking catalyst of the same type as above described and is introduced through line 38 and is further mixed with the oil in pump 42. The temperature during mixing in pump 42 is between about 400° F. and 600° F. and the time of treatment is between about 0.25 and 1 minute. The slurry of regenerated catalyst particles from line 38 comprises 50 weight percent catalytically cracked heavy cycle oil wash liquid and the rest catalyst.

The mixture from pump 42 is introduced into a second hydroclone 44, which is of the same construction as hydroclone 32, to separate partially spent catalyst particles from purified oil. The separated catalyst is withdrawn from the bottom of the hydroclone 44 through line 46 as a slurry. The catalyst particles in hydroclone 44 adsorb further amounts of impurities from the oil feed being treated. The slurry of partially spent catalyst particles in line 46 and cycle stock is the one which is passed through line 26 as above described and introduced into the first hydroclone 32 as the adsorbent catalyst particles. The slurry in line 46 contains 50 weight percent oil and 50 weight percent catalyst. The efficiency of hydroclone 44 is of the same high order as hydroclone 32. While two stages of hydroclones are preferred and shown on the drawing, more than two stages may be used. In some cases only one stage may be necessary. The amount of catalyst particles introduced via line 38 is between about 0.05 and 0.50 part by weight to 1 part by weight of oil.

The purified oil with a lower metal content and lower aromatic high boiling liquid content is withdrawn overhead from the second hydroclone 44 through line 48 and is passed as oil feed to the catalytic cracking unit 52. The purified oil has between about 10–40% of the metals of the untreated oil. The cracking unit 52 is diagrammatically shown and includes a reactor and a catalyst regenerator (not shown). The cracking unit may be a fixed bed, a moving bed or fluid bed unit but is preferably a fluid unit. The temperature during the cracking in the reactor is between about 850° F. and 1000° F. and the temperature during regeneration is between about 1000° F. and 1250° F. The w./hr./w. is between about 2 and 40. The catalyst is a conventional silica-alumina catalyst containing 10–35% alumina and having a particle size mostly below 60 mesh and mostly between about 5 and 150 microns.

The hot catalytically cracked products leave the cracking unit through line 54 and are introduced into bottom portion of the product fractionator 56 for fractionating products into a gaseous hydrocarbon fraction which is taken overhead through line 58, a gasoline fraction which is taken off as a side stream 64 and a heating oil fraction which is taken off as a side stream through line 66 below the level of line 64. An aromatic heavy cycle gas oil or recycle fraction is withdrawn from a lower portion of the product fractionator 56 through line 68. The heavy cycle gas oil has a boiling range of 550–600° F. to 800–900° F. A portion of this heavy cycle gas oil is preferably recycled through line 72 to the catalytic cracking unit 52 for further cracking. Another portion of the heavy aromatic cycle oil from line 72 may be passed through line 73 for supplying solvent liquid to line 36 leading to hydroclone 44. The heavy cycle gas oil has about 40–50 weight percent aromatic hydrocarbons predominantly 2 and 3 ring aromatic hydrocarbons (50–60%) and alkyl benzenes and some 4 ring aromatic hydrocarbons.

Returning now to the spent catalyst particles withdrawn from the first hydroclone 32 as a slurry through line 34, the spent catalyst slurry is mixed with a partially spent wash oil from line 74 and the mixture is further mixed in pump 76. The wash or solvent oil dissolves and washes off the contaminating material on the catalyst particles. The wash oil comprises heavy aromatic cycle gas oil which is partially spent as it comes from a second washing step to be presently described. The temperature of the resulting mixture in pump 76 is between about 400°

F. and 600° F. and the time of treating is between about 0.25 and 1 minute. The amount of wash oil used is between 0.5 and 2 parts by weight to 1 part by weight of partially spent catalyst withdrawn through line 34.

The oil-catalyst mixture or slurry is introduced into a third hydroclone 78 for separating partially regenerated finely divided catalyst from the spent wash or solvent oil. The spent solvent oil is withdrawn overhead through line 82 and a portion thereof may be passed through lines 84 and 86 for recycling to hydroclone 78 for the washing or regenerating of the finely divided catalyst. The partially regenerated finely divided catalyst slurry withdrawn from the bottom of the hydrocolone 78 through line 88 is preferably mixed wtih fresh heavy aromatic cycle gas oil from line 89 which takes cycle oil from line 68. The resulting mixture is further mixed in pump 92. The slurry in line 88 comprises 50% by weight catalyst and 50% by weight of oil.

The temperature of the mixture in pump 92 is between about 400° F. and 600° F., and the time of treating is between about 0.25 and 1 minute. The amount of heavy cycle gas oil used is between about 1 and 10 parts by weight to 1 part by weight of the partially regenerated catalyst particles.

The slurry or mixture is passed from pump 92 through line 94 to a fourth hydroclone 96 to separate a slurry of regenerated or washed catalyst particles from partially spent heavy cycle wash or solvent oil. The separated partially spent wash or solvent oil is withdrawn overhead through line 98 and comprises the oil passed through line 74 about referred to, for admixture with the spent catalyst particles withdrawn from the first hydroclone 32 through line 34 above mentioned and described. The catalyst particles in hydroclone 96 are further washed to dissolve and remove adsorbed metal organic or contaminating material from the catalyst particles.

Regenerated catalyst or washed catalyst particles are withdrawn as a slurry from the bottom of the fourth hydroclone 96 through line 102 and these regenerated catalyst particles comprise the fresh or regenerated catalyst particles introduced into line 36 from line 38 above mentioned. The slurry in line 102 comprises 50 weight percent solids and 50 weight percent oil.

The aromatic wash or solvent liquid used in washing the spent and partially spent catalyst particles comprises heavy cycle gas oil above described and is supplied by line 68 withdrawn as a side stream from the product fractionator 56. A portion of the withdrawn heavy aromatic cycle gas oil is passed through line 89 and introduced into line 88 for washing the partially regenerated catalyst particles in the last hydroclone 96. Or a portion of the cycle gas oil in line 89 may be passed through line 101 as wash liquid and introduced into line 34 to provide some fresh wash oil for washing spent catalyst from hydroclone 32. If desired, some of the cycle oil from line 68 may be withdrawn from the system through line 112.

Instead of sending all or a portion of spent solvent or wash liquid from lines 82 and 84 to the pipe still 12 and/or vacuum still 16 through line 104, all or a portion of the wash liquid from line 82 may be passed through line 114 to a region below withdrawal line 68 and above inlet line 54 of the product fractionator 56 where the high boiling contaminants are rejected as high boiling compounds and withdrawn as fractionator bottoms through line 62. This is particularly suitable if the light catalytic cycle oil from line 66 or naphtha from line 64 is used as the wash liquid. This minimizes the wash liquid ending up in the feed to the catalytic cracking unit 52. If the spent wash liquid is introduced into the atmospheric and/or vacuum still 16 with the catalytic cracking oil feed, the high boiling contaminants in the spent wash liquid are rejected with the bottoms fraction withdrawn through line 13 from the atmospheric still 12 and/or line 18 from the vacuum still 16. If desired, more than two catalyst regenerator hydroclones (78 and 96) may be used or only one may be used in some cases.

Make-up catalyst particles for treating the oil feed are preferably introduced into line 38 from inlet line 115.

As above pointed out, there is substantially no loss of solvent or wash liquid as it is supplied by the catalytic cracking unit and any solvent and/or oil feed which remains in the finely divided adsorbent cracking catalyst used for treating oil feed, will eventually go to the fluid catalytic cracking unit. The extremely fine catalyst or fines comprising the adsorbent cracking catalyst which find their way to the fluid catalytic cracking unit, will be lost or discarded from the system. Make-up solvent for line 89 is readily available from the product fractionator 56 as a heavy cycle gas oil withdrawn as a side stream through line 68.

Where only a single stage catalyst purification stage is used, the purified oil in line 36 is passed directly to the catalytic cracking unit 52. Fresh or regenerated catalyst particles are introduced into line 22 through line 26. Spent catalyst particles from line 34 are treated with fresh heavy cycle gas oil from line 68 via line 101 and the mixture passed to hydroclone 78. Spent wash cycle gas oil passes overhead from line 82 to pipe still 12 and vacuum still 16. Regenerated or washed catalyst particles from line 88 in this modification are recycled as fresh catalyst via line 26. While a single stage may be used, the use of multi-stages improves metals removal.

Vacuum gas oils can be treated as is but should be hot enough to keep the gas oil fluid. Oils such as deasphalted oils, residual stocks etc. may be used and if necessary can be fluxed with solvents such as light virgin gas oils, carbon tetrachloride, hydrocarbon oils etc. With a 90% yield of treated oil there is about a 58% reduction in the AR (aromatic index or polynuclear aromatics) and 50-70% metals in a single stage treatment. AR represents the percent of carbon atoms in aromatic rings, whereas the percent aromatics represents the percent of the feed which is aromatic. The AR is used here to show polynuclear aromatics reduction. The AR determination is made by refractive index of the treated oil compared to the untreated oil.

In the following examples the catalyst used was fresh silica-alumina cracking catalyst containing 13% alumina. The catalyst was dried for 12 hours at 300° F. The catalyst was in powder form below 150 microns in size.

EXAMPLE 1

Mixed sweet heavy gas oil boiling between about 650° F. and 1050° F. and having an AR of 7.6 was mixed for about 15 seconds with dried silica-alumina catalyst in a ratio of 3 parts of oil feed by weight to 1 part by weight of catalyst. The temperature during mixing was 200° F. The mixture was filtered to recover the catalyst. The oil yield was 89%. The percent removal of AR was 43.

EXAMPLE 2

In this example the oil was treated to reduce AR and Conradson Carbon. Phenol raffinate feed having a boiling range of 650° F.–1050° F. was mixed with carbon tetrachloride in the ratio of 8 to 1 parts by weight of CCl$_4$ to oil feed at room temperature and silica-alumina cracking catalyst in an amount of 1 to 1 of catalyst to oil. The time of mixing was 15 seconds. The AR of the oil feed was 13.3 and the Conradson Carbon was 1.5%. The treated oil was recovered in 93% yield and there was about 50% removal of AR and 83% removal of Conradson Carbon.

EXAMPLE 3

This example shows reduction of AR and metals using a solvent. The feed was deasphalted oil boiling above about 900° F. and admixed with 8 parts by weight of CCl$_4$ to 1 of deasphalted oil at room temperature. The amount of silica-alumina catalyst used was 1 to 1 by weight of the deasphalted oil. The time of mixing was 15 seconds. The deasphalted feed had an AR of 19 and an equivalent nickel content of 1.2 p.p.m. A yield of 88% was obtained and the reduction in equivalent nickel content was 67% and the reduction in AR was 75%.

EXAMPLE 4

In this example residual oil boiling above 1050° F. was admixed with catalyst in an amount of 1 part of catalyst per 2 parts of oil feed. The temperature was 700° F. and the time of treatment or reaction was 5 minutes. The treated residual oil feed contained 52.7 p.p.m. of equivalent nickel which was a 52% reduction in the metals content of the oil.

EXAMPLE 5

In a specific embodiment of the invention a residual oil having an initial boiling point of 600° F. is heated to about 750° F. and fractionated in vacuum pipe still 16 under a vacuum of 100 mm. of mercury. The overhead distillate in line 22 has a boiling range of about 600° F. to 1100° F. The distillate is cooled at 24 to about 400° F. and to this oil is added 0.3 pound of fresh silica-alumina cracking catalyst per pound of distillate oil in line 22. The catalyst contains 25% alumina and is of a size below 150 microns. The distillate oil in line 22 is contaminated with 1.2 w.p.p.m. of vanadium, 1.0 w.p.p.m. of nickel and 3.4 w.p.p.m. of iron The time of mixing is 0.25–0.50 minute.

The mixture of oil and catalyst particles are further mixed in pump 28 and the mixture passed to hydroclone 32 to separate the spent finely divided silica-alumina particles as a slurry from purified oil which has a reduced amount of contaminants. In the purified oil the amount of vanadium is 0.4 w.p.p.m., the nicked is 0.3 w.p.p.m. and the iron is 1.1 w.p.p.m. About 90–95% of the oil feed is recovered as purified oil. The purified oil is taken off overhead and is then sent to fluid catalytic cracking unit 52 where the oil is cracked at a temperature of 920° F. and the cracked products are fractionated at 56 to separate 50 vol. percent of gasoline from 16 vol. percent of heavy aromatic cycle gas oil which is withdrawn through line 68 with the rest being gaseous overhead and liquid bottoms withdrawn through line 62. A portion of this cycle oil may be recycled to the catalytic cracking unit 52. The heavy aromatic cycle gas oil has a boiling range of 600° F. to 900° F. and contains 50% aromatics.

The spent finely divided catalyst is withdrawn from hydroclone 32 as a slurry from the first stage of treating the catalytic cracking feedstock and is mixed with the heavy aromatic cycle gas oil from line 68 at a temperature of 700° F. About one pound of the heavy cycle gas oil to 1 pound of spent catalyst is used. The spent catalyst and oil mixture is further mixed in the pump. The time of mixing is 0.25–0.50 minute. The pump then passes the mixture to a second hydroclone like 78 for separating spent heavy aromatic cycle gas oil from a slurry of regenerated or washed finely divided catalyst particles which are re-used in treating further amounts of catalytic cracking feedstock in line 22. About 90–95% of the aromatic cycle oil is recovered.

The spent heavy aromatic cycle wash gas oil is then returned to the vacuum pipe still 16 to separate high boiling contaminants and to recover cycle gas oil. The separated liquid contaminants and high boiling materials are removed in the bottoms fraction from pipe still 16 through line 18. The purified gas oil passes overhead with feed through line 22 for further treatment in the unit. Any fine catalyst particles containing cycle oil solvent which are entrained go through the catalytic cracking step to crack the occluded solvent. Undesired fine spent catalyst particles can be discarded from the unit in any desired manner. Some fines are lost with the regeneration gases leaving the regenerator.

The slurry in each of lines 34, 46, 88 and 102 may contain 30% to 60% by weight of catalyst and the rest oil and is not restricted in amount to 50% by weight of catalyst.

What is claimed is:

1. A method for removing catalyst contaminating material from oil feed stocks for catalytic cracking which comprises mixing a high boiling contaminated hydrocarbon oil feed with finely divided cracking catalyst at an elevated temperature in at least one stage, passing the resulting oil-catalyst mixture into a hydroclone for separating at least 95% of the partially spent catalyst particles from treated oil feed having a reduced contaminant content, catalytically cracking the treated oil feed to produce lower boiling hydrocarbons, fractionating the catalytically cracked lower boiling products to recover gasoline and cycle oil, mixing at least part of the recovered cycle oil with said partially spent finely divided catalyst particles separated in said hydroclone to regenerate and wash said finely divided catalyst particles and passing the resulting mixture to a second hydroclone for separating washed or regenerated finely divided catalyst particles from the cycle oil in at least one stage and utilizing the separated washed finely divided catalyst for treating further amounts of contaminated oil feed for catalytic cracking.

2. A method of removing catalyst contaminating material from hydrocarbon oil feed stocks for catalytic cracking which comprises subjecting a high boiling residual oil to distillation to separate a distillate boiling below about 1100° F. from a bottoms fraction boiling above about 1100° F., mixing finely divided cracking catalyst of a size below about 150 microns with said distillate of a temperature between about 400° F. and 600° F., for a time between about 0.25 and 1 minute, the amount of catalyst particles used being between about 0.1 and 0.5 part by weight per part by weight of distillate oil, separating spent catalyst particles from purified oil feed in a hydroclone, catalytically cracking said purified oil feed to produce cracked products, fractionating said cracked products to recover gasoline and heavy aromatic cycle oil, mixing at least part of said heavy aromatic cycle oil with said separated spent catalyst particles to wash and regenerate said spent catalyst particles, using about 1 part by weight of heavy aromatic cycle oil to 1 part by weight of spent catalyst particles at a temperature between about 600° F. and 800° F. and for a time between about 0.25 and 1 minute, separating regenerated catalyst particles from spent heavy aromatic cycle oil in a second hydroclone, utilizing said regenerated catalyst particles in said first mixing step above defined for treating contaminated distillate oil and passing at least a portion of said spent heavy aromatic cycle oil to said distillation step to remove contaminants from said spent aromatic cycle oil in the bottoms fraction.

3. A process according to claim 2 wherein at least a portion of said spent contaminated aromatic cycle oil is passed to said fractionating step to remove contaminants from said contaminated cycle oil as bottoms.

4. A method of removing catalyst contaminating material from hydrocarbon oil feed stocks for catalytic cracking which comprises subjecting a high boiling residual oil to vacuum distillation to separate a gas oil distillate boiling below about 1100° F. from a bottoms fraction boiling above about 1100° F., mixing partially spent finely divided cracking catalyst of a size below about 150 microns with said gas oil distillate at a temperature between about 400° F. and 600° F. for a time between about 0.25 and 1 minute, the amount of catalyst particles used being between about 0.1 and 0.5 part by weight per part by weight of gas oil distillate, separating spent catalyst particles from partially purified gas oil distillate feed in a hydroclone, mixing the separated partially purified gas oil distillate with more active regenerated finely divided cracking catalyst of the same type and size used above in treating the gas oil distillate, maintaining the same time and temperature conditions as used above in treating the gas oil distillate, separating partially spent catalyst particles from purified gas oil distillate in a second hydroclone, using the last mentioned partially spent catalyst particles as the partially spent catalyst particles in said first mixing step above defined, catalytically cracking said purified gas oil distillate to produce cracked products, fractionating said cracked products to separate gasoline from gases, heavy cycle aromatic oil and a bottoms fraction, mixing partially contaminated cycle aromatic oil with said separated spent catalyst particles in an amount of partially contaminated cycle aromatic oil of 1 part by weight of said partially contaminated cycle aromatic oil to 1 part by weight of spent catalyst particles at a temperature between about 600° F. and 800° F. and for a time between about 0.25 and 1 minute to wash off impurities from said spent catalyst particles to regenerate them, utilizing at least part of said heavy cycle aromatic oil as make-up wash oil, separating partially regenerated catalyst particles from spent heavy cycle aromatic oil in a third hydroclone, passing said spent heavy cycle aromatic oil to said vacuum distillation step to remove contaminants from said heavy cycle aromatic oil to recover purified cycle oil, mixing said partially regenerated catalyst particles with said heavy cycle aromatic oil separated from said catalytically cracked products in about 1 part by weight of heavy cycle aromatic oil with 1 part by weight of partially spent catalyst particles at a temperature between about 600° F. and 800° F. and for a time between about 0.25 and 1.0 minute, separating regenerated catalyst particles from partially spent cycle aromatic oil in a fourth hydroclone, using the regenerated catalyst particles in said second mixing step above for treating partially purified gas oil distillate and utilizing said partially spent cycle aromatic oil in said first washing or regenerating step above defined for treating spent catalyst particles.

5. A method of removing catalyst contaminating material from hydrocarbon oil feed stocks for catalytic cracking which comprises subjecting a high boiling residual oil to vacuum distillation to separate a distillate boiling between about 600 and 1000° F. from a bottoms fraction boiling above about 1000° F., mixing finely divided cracking catalyst of a size below about 150 microns with said distillate of a temperature between about 400° F. and 600° F., for a time between about 0.25 and 1 minute, the amount of catalyst particles used being between about 0.1 and 0.5 part by weight per part by weight of distillate oil, separating spent catalyst particles from purified oil feed in a hydroclone, catalytically cracking said purified oil feed to produce cracked products, fractionating said cracked products to recover gasoline and aromatic cycle oil, mixing at least part of said aromatic cycle oil with said separated spent catalyst particles to wash and regenerate said spent catalyst particles, using about 1 part by weight of aromatic cycle oil to 1 part by weight of spent catalyst particles at a temperature between about 600° F. and 800° F. and for a time between about 0.25 and 1 minute, separating regenerated catalyst particles from spent aromatic cycle oil in a second hydroclone, utilizing said regenerated catalyst particles in said distillate oil treating step and passing at least part of said separated spent aromatic cycle oil to said fractionation step to remove contaminants from said cycle oil.

6. A method of removing catalyst contaminating material from hydrocarbon oil feed stocks for catalytic cracking which comprises subjecting a high boiling residual oil to distillation to separate a distillate boiling below about 1100° F. from a bottoms fraction boiling above about 1100° F., mixing finely divided cracking catalyst of a size below about 150 microns with said distillate of a temperature between about 600° F. and 800° F., for a time between about 0.25 and 1 minute, the amount of catalyst particles using being between about 0.1 and 0.5 part by weight per part by weight of distillate oil, separating spent catalyst particles from purified oil feed in a hydroclone, catalytically cracking said purified oil feed to produce cracked products, fractionating said cracked products to recover gasoline and heavy aromatic cycle oil, mixing at least part of said heavy aromatic cycle oil with said separated spent catalyst particles to wash and regenerate said spent catalyst particles, using about 1 part by weight of said heavy aromatic cycle oil to 1 part by weight of spent catalyst particles at a temperature between about 600° F. and 800° F. and for a time between about 0.25 and 1 minute, separating regenerated catalyst particles from spent heavy aromatic cycle oil in a second hydroclone, utilizing said regenerated catalyst particles in said distillate oil treating step and passing said spent heavy aromatic cycle oil to said distillation step to remove high boiling contaminants from said cycle oil.

References Cited
UNITED STATES PATENTS

| | | | |
|---|---|---|---|
| 2,761,821 | 9/1956 | Jahnig | 208—91 |
| 2,914,458 | 11/1959 | Harper | 208—253 |
| 3,201,341 | 8/1965 | Anderson et al. | 208—74 |

SAMUEL P. JONES, *Primary Examiner.*